April 24, 1956 R. C. TRESEDER 2,742,929
PRESSURE STORAGE DEVICE
Filed March 27, 1953
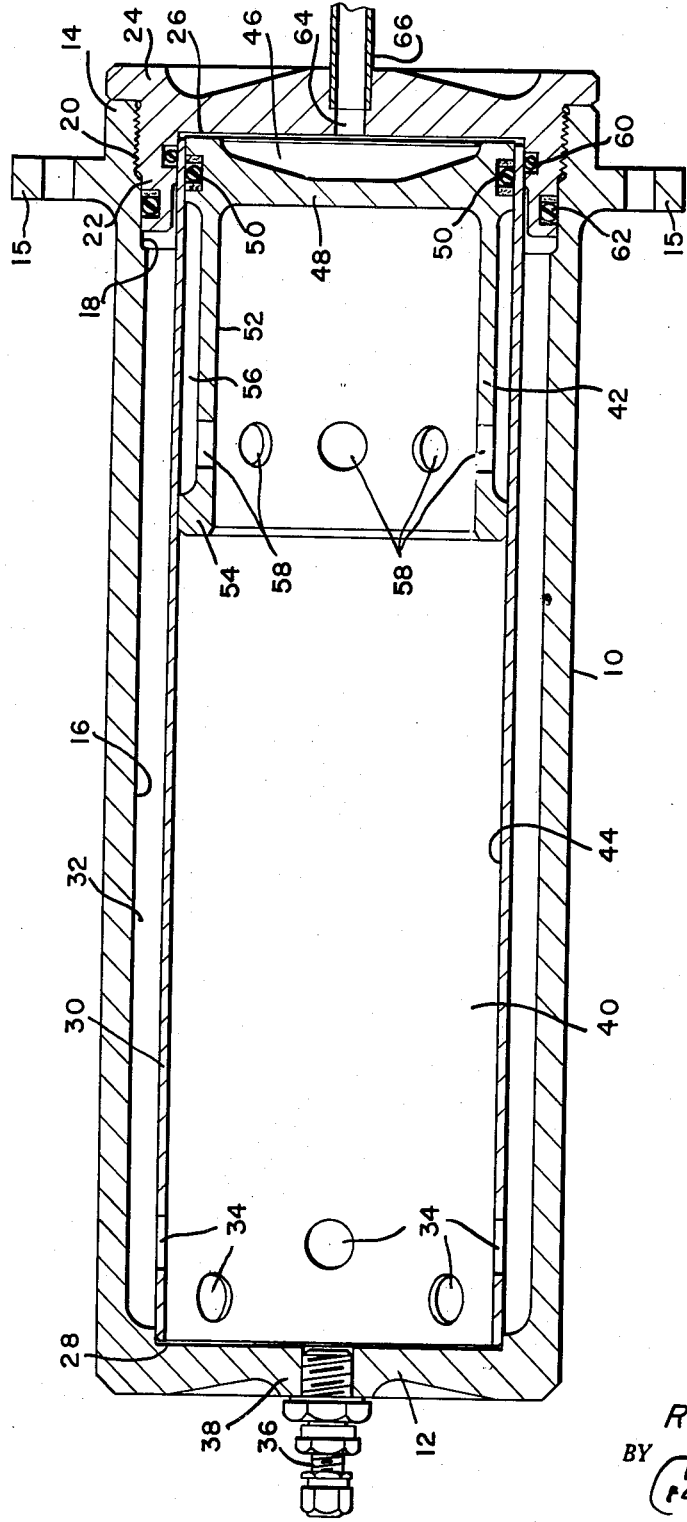
INVENTOR.
Robert C. Treseder
BY
Attorney

United States Patent Office 2,742,929
Patented Apr. 24, 1956

2,742,929

PRESSURE STORAGE DEVICE

Robert C. Treseder, Dayton, Ohio, assignor to General Motors Corporation, Detroit, Mich., a corporation of Delaware Application March 27, 1953, Serial No. 345,164

3 Claims. (Cl. 138—31)

This invention relates to pressure storage devices, sometimes called pressure accumulators, and has for an object to provide a structure of simple construction yet efficient in operation including means for preventing leakage of the fluid which is stored under pressure.

The principal object of the invention is to provide a structure which will effectively prevent leakage between the loadng chamber and the pressure storage chamber, and will eliminate damage to the chamber wall which might interfere with the free working of a dividing member such as a piston which separates the chamber into a pressure storage chamber and a preloading chamber and which slides within the chamber. Pressure storage devices of this general type, having a chamber with a rigid wall in which a piston slides and in which fluid under heavy pressure is stored that is made immediately available to change the pitch of propeller blades by actuation of a control valve, are disclosed in the U. S. patent to Richardson et al., #2,505,206.

In this type of device for storing fluid under pressure, especially when working under very high pressures, the cylinder within which the piston moves is exposed to large hydraulic forces, tending to expand or enlarge the cylinder so that the piston and cylinder relation no longer maintains the close fittings established at the factory. In such high pressure structures the tolerances between piston diameter and cylinder diameter are very close, and while seal rings may be incorporated, it is practically impossible to maintain a non-leakage relation. This is true even when the cylinder is of relatively massive construction.

According to the present invention, the desired result is obtained by fitting and mating a free piston for close engagement with the bore of a thin wall cylinder, and by enclosing the piston and cylinder within a rigid housing member so that there is an annular spacing between the cylinder and housing. Apertures through one end of the cylinder make communication between the bore of the cylinder and the spacing so that fluid under pressure is maintained on both sides of the cylinder, whereby pressure on the cylinder wall is balanced and the wall is never subjected to distorting pressures irrespective of the load or charge of the preloading chamber, or pressure differentials between it and the pressure storage chamber.

Further objects and advantages of the present invention will be apparent from the following description, reference being had to the accompanying drawings wherein a preferred embodiment of the present invention is clearly shown.

In the drawing:

The single figure of the drawing is a longitudinal section of an accumulator illustrating the invention. The numeral 10 refers to an outside housing of cup form having a bottom wall 12 and a rim or cylindrical flange 14 joined by a mounting flange 15. The housing 10 may be a deep drawn cup, or it may be a cast member, or otherwise formed to provide a bore 16 throughout its length and made of strong enough material to withstand the potential of the pre-loading pressure. The interior of the bore 16 of the housing may be rough, and need only be machined at 18 and threaded at 20 to receive a flange 22 of a cap member 24 threaded into the open end. The interior of the flange 22 is machined at 26, and the bottom wall 12 of the housing is machined at 28 to provide shoulders that pilot and support the ends of a thin steel cylinder 30 which, when the parts are assembled, provide a space 32 within the housing and outside of the cylinder 30.

The space or chamber 32 extends throughout the full length of the cylinder 30 and is always in communication with the interior of the cylinder 30 by means of openings 34 ranged in staggered relation. Though the cylinder 30 may be made of thin stainless steel, or even some more fragile material, it is free from distortion by means of fluid pressure which might result in collapse or expansion of the cylinder if pressure is supplied only to one side thereof. A filler valve 36 of the bicycle type is threaded into a central boss 38 provided by the bottom wall 12 of the housing member, and makes for filling of the interior 40 of the cylinder with preloading gas such as nitrogen under high pressure.

A free piston 42 divides the bore 44 of the cylinder 30 into the preloading chamber 40 and a pressure storage chamber 46. The piston 42 comprises a head member 48 having a sealing flange 50 at one end separated by a cylindrical portion 52 joining a guiding flange 54, there being an annular space 56 separating the two flanges and communicating with the inside of the skirt by openings 58. By this construction, the piston 42 is free to move the length of the cylinder 30 under the potential of pressure dominating in the chambers 40 or 46. As shown in the figure, the piston 42 is at the extreme right under the effect of the pressure in the preloading chamber 40.

Though the pressure in chamber 40 may be as much as 4000 p. s. i. it is prevented from passing to the pressure storage chamber 46 by the sealing flange 50 carried by the piston, and by a seal 60 between the inside of flange 22 and the right hand end of cylinder 30 engaging the shoulder 26. A seal ring 62 between the flange 22 and the portion 18 of the housing 10 prevents leakage from the inside of the housing to atmosphere. The cap member 24 has a central aperture 64 receptive of a tubular connection 66 by which the accumulator, and particularly the pressure storage chamber 46, may be connected into a fluid pressure service line. The potential of pressure in the line 66 and pressure storage chamber 46 may change from a very low value to the maximum value obtainable by diminution or substantial collapse of the preloading chamber 40.

Assuming that the preloading chamber 40 is charged with a gas at a potential of about 4000 p. s. i. the pressure in a pressure storage chamber 46 must be greater than 4000 p. s. i. before the piston 42 will be moved to the left. Movement of the piston to the left of the position shown tends to reduce the volume of chamber 40 and increase the volume of chamber 46. Thus the piston may occupy any intermediate position along the bore of the cylinder. Any reduction in volume of the chamber 40, as effected by movement of the piston to the left as viewed in the drawing, not only reduces the volume of the chamber 40 but also increases the pressure therein which in turn is communicated by the apertures 34 to the space 32, and through the apertures 58 to the annular space 56. This relationship obtains even though the piston 42 is moved over against the bottom wall 12 of the cup or housing. The guiding flange 54 is of such axial extent that it never entirely closes all of the passages 34 through the end of the cylinder 30. At each and every position of the piston as it moves toward the left, both the interior and exterior of the thin wall cylinder 30 is exposed to the same pressure throughout its length inside and outside.

As an example, assuming that the piston has moved to a point where the gas in the chamber 40 is at 4010 p. s. i., then all of the space 32 outside of the cylinder is at a pressure of nitrogen gas at 4010 p. s. i., and the interior of the cylinder 30 extending from the bottom wall 12 to the left hand side of piston 42 is also exposed to the nitrogen gas under 4010 p. s. i. The chamber 46, now enlarged by movement of the piston to the left, and within the right hand end portion of the cylinder is under pressure of liquid at 4010 p. s. i. That is, assuming that the pressure line 66 is connected into a fluid pressure system using a liquid as a working medium. In all events the high pressures applied to the interior of the cylinder 30 are opposed by an equal high pressure on the outside thereof so that there is no danger of the thin wall cylinder being expanded enough to cause leaks at the moving seals, or to be collapsed which might interfere with the free movement of the piston throughout its length.

While the embodiment of the present invention as herein disclosed, constitutes a preferred form, it is to be understood that other forms might be adopted.

What is claimed is as follows:

1. An accumulator including, a deep drawn cup constituting a housing, a flanged cap member closing the open end of said cup, a thin walled cylinder concentrically disposed within the cup, means piloting the ends of the cylinder in the bottom of the cup and in the flanged cap member, respectively, so as to form a first annular space between the cup and the cylinder throughout substantially its entire length, a piston freely movable within the cylinder having axially spaced guiding and sealing flanges engaging the bore of said cylinder, said piston having a relieved portion between said spaced flanges which defines a second annular space between the cylinder and the piston, said piston dividing said cylinder into a preload chamber and a fluid storage chamber, first passage means connecting said first annular space with the preload chamber so as to equalize the pressure on both sides of said cylinder, and second passage means connecting the second annular space with the preload chamber, said first and second passage means cooperating to prevent interruption of communication between said preload chamber and said first annular space due to movement of the piston.

2. An accumulator including, a deep drawn cup constituting a housing, a flanged cap member closing the open end of said housing, said housing and said cap member having longitudinally spaced cylindrical shoulders concentric with the housing, a thin walled sleeve having opposite ends supported by the shoulders of said housing and said cap member so as to form a first annular space between said sleeve and the interior of said housing which extends substantially the entire length thereof, a skirted piston movable axially relative to said sleeve having axially spaced sealing and guiding flanges engageable with the interior of said sleeve, said spaced piston flanges defining a second annular space between the sleeve and the piston, first passage means connecting the second annular space with the interior of said sleeve, and second passage means connecting said first annular space with the interior of said sleeve, said first and second passage means cooperating to prevent interruption of communication between the interior of the sleeve and said first annular space due to piston movement.

3. An accumulator including, a cylinder, a reciprocable piston disposed in said cylinder, said piston comprising a cup-shaped member having a pair of axially spaced flanges with a relieved portion therebetween defining an annular space between the piston and the cylinder, passage means through said relieved piston portion, an outer casing enclosing the cylinder and radially spaced therefrom throughout substantially the entire length thereof, and passage means through said cylinder for equalizing the pressure on opposite sides thereof, said cylinder passage means being longitudinally spaced and cooperating with the piston passage means so as to prevent interruption of communication between opposite sides of said cylinder due to movement of said piston.

References Cited in the file of this patent

UNITED STATES PATENTS

| | | |
|---|---|---|
| 2,417,873 | Huber | Mar. 25, 1947 |
| 2,440,065 | Ashton | Apr. 20, 1948 |